Figure 1:
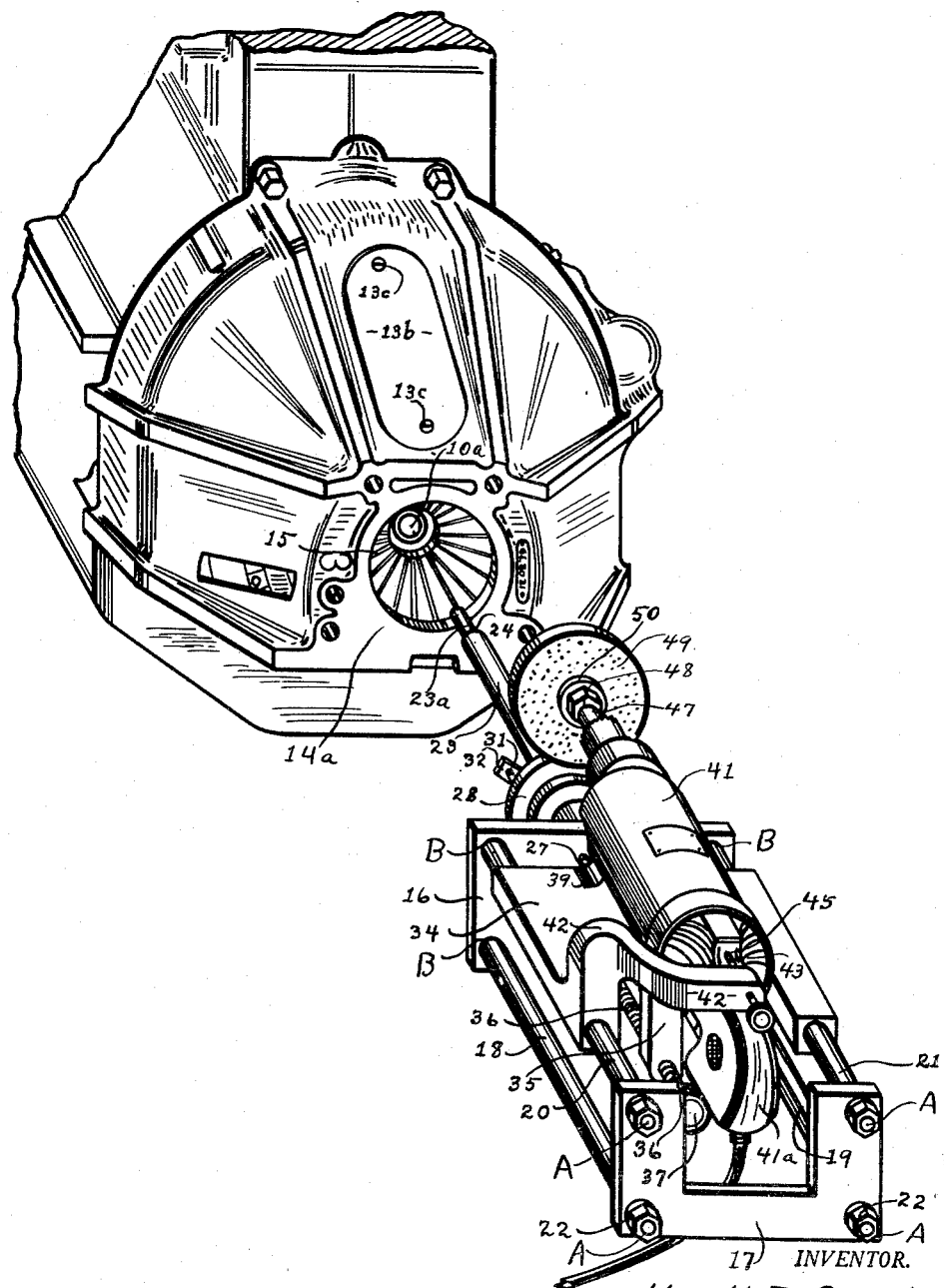

May 3, 1955

H. R. GRUNDER 2,707,358

HOUSING GRINDERS FOR TRANSMISSION ALIGNMENT

Filed Oct. 14, 1950

2 Sheets-Sheet 1

INVENTOR.
Harold R. Grunder
BY
M. Y. Charles
ATTORNEY

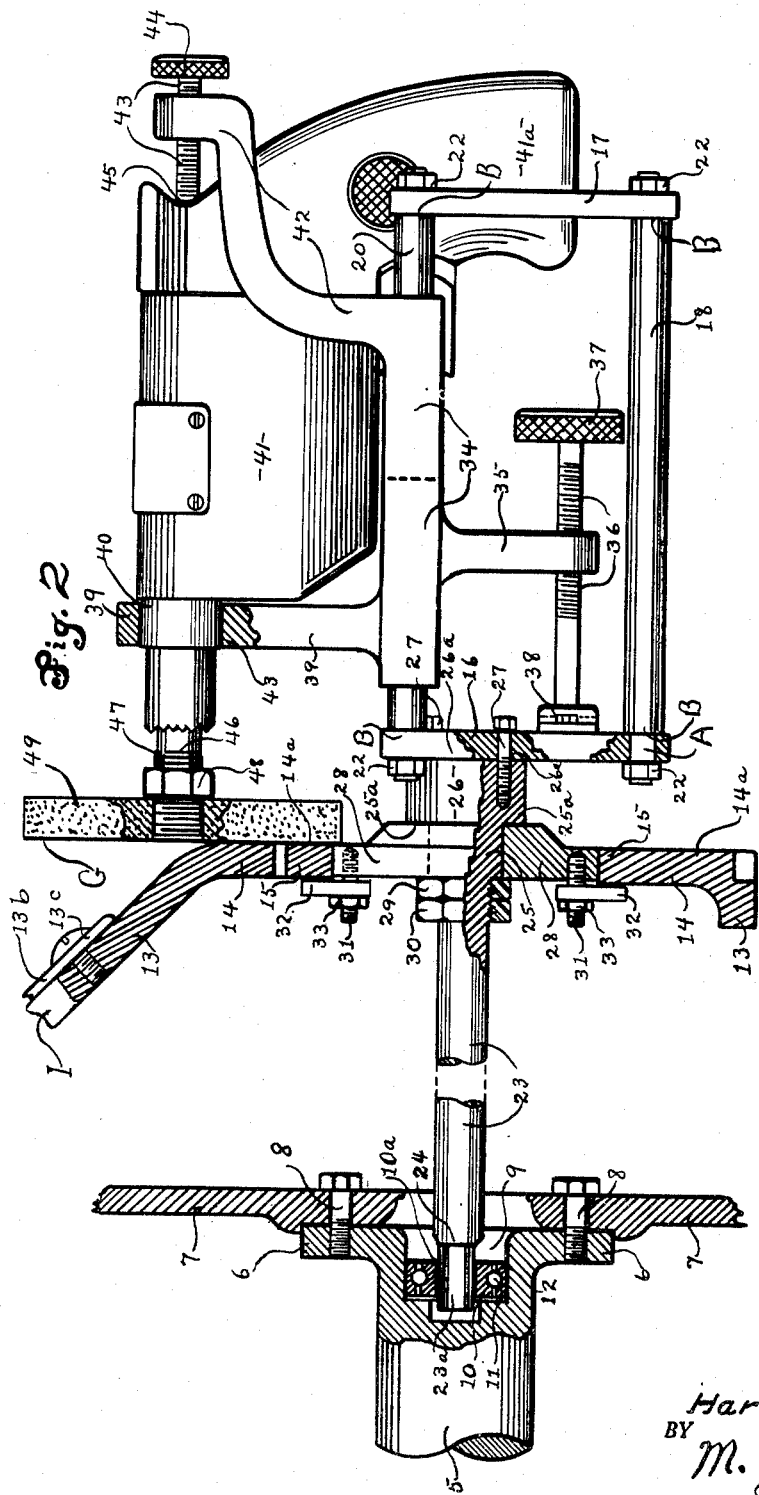

United States Patent Office 2,707,358
Patented May 3, 1955

2,707,358

HOUSING GRINDERS FOR TRANSMISSION ALIGNMENT

Harold R. Grunder, Wichita, Kans., assignor of one-third to Leo Gray and one-third to William R. Whitehead, both of Wichita, Kans.

Application October 14, 1950, Serial No. 190,140

1 Claim. (Cl. 51—241)

In some automobiles, particularly in the automobile known as the "Chevrolet," much trouble of the transmission jumping out of high gear has been experienced, even in new cars, as well as cars that have been used for only a very short time. Much time and study has been spent by factory engineers as well as many service men all over the country to find out or determine what it is that is responsible for this trouble. The investigations and studies carried on over some period of time and at many places has revealed that the surface of the clutch housing against which the transmission case abuts has not been carefully prepared and when the transmission case is placed against the transmission bearing face of the clutch housing and is rigidly bolted thereto the main journals of the engine crank shaft and transmission drive shaft do not axially align themselves, each with the other. Because of this mis-alignment the shafts urge an imparting of a swinging or wabbling motion from one to the other and this creates a tendency of the transmission gears to crawl one on another in an increasing amount as time goes along and in the beginning the transmission will occasionally jump out of high gear as the vehicle moves along; and as time goes along and the vehicle gives more and more service, the frequency with which the transmission will jump out of high gear will increase.

It has been found that this trouble can be entirely overcome by re-machining or grinding the clutch case face against which the transmission case bears, to such a point, which can be determined by instruments, that when the transmission case is placed against the transmission bearing face of the clutch case and is rigidly attached thereto by means of bolts provided for that purpose, the center longitudinal axis of the engine crank shaft main journals and the longitudinal center axis of the transmission drive shaft will line up and be a continuous perfect aligned axis extending through the main journals of the engine crank shaft and the drive shaft line of the transmission. This having been achieved it has been found that the exasperating trouble of the transmission jumping out of high gear has been eliminated.

In the search for the causes and remedy of this trouble I have found that the trouble can best be overcome by doing a job of regrinding the transmission case bearing face on the clutch case while the clutch case is still in an undisturbed condition and rigidly attached to the crank case of the engine. In order to do this a special grinder tool is required and there has been no such tool, therefore I have provided and made a special tool for doing the required grinding job which I have used and has given perfect satisfaction. The tool is made as shown in the accompanying drawings and described in the following specification.

Now referring to the accompanying drawings in which similar numerals of reference designate the same parts throughout the several figures of the drawings: Fig. 1 is a perspective view of a clutch housing showing the transmission bearing surface that is to be ground and also showing my improved grinding machine in position to be moved toward the clutch housing to do the necessary job of grinding.

Fig. 2 is an enlarged detail longitudinal sectional view through the rear end of the engine crank shaft, the clutch housing, and the grinding machine. The grinding machine is shown in place and ready to do the grinding job.

In the drawings is shown the rear end portion of the engine crank shaft 5 on which is integrally formed the fly wheel attachment flange 6 to which the fly wheel 7 is rigidly attached by means of cap screws 8. The rear end portion 5 of the crank shaft has an annular recess 9 therein that is centered about the longitudinal axis of the crank shaft main journals 5, and in which is seated an anti-friction bearing assembly 10—11—12.

The upper side of the clutch housing 13 has an inspection opening I therein that is covered and closed by a plate 13b that is held in place by screws 13c that are slidably passed through holes in the plate 13b and are threaded into the clutch housing 13. The clutch housing 13 has a rear vertically positioned wall portion 14 that has a circular opening 15 therein that is centered on the axial line of the crank shaft main journals 5 and the transmission drive shaft, not shown. The edge of the material defining the opening 15 is tapered convergingly from rear toward the front as a portion of the suface of a cone whose apex lies within the clutch case and on the center axis line of the journal, the outer face 14a thereof being intended to be positioned in a plane that is ninety degrees to the longitudinal axis of the main journals 5 of the engine crank shaft. It is the surface 14a that must lie in a plane that is ninety degrees to the longitudinal axis of the main journals 5 of the crank shaft because the transmission housing abuts the surface 14a and this is the thing that determines the perfect alignment of the transmission drive shaft with the main journals 5 of the engine crank shaft. In the search and examinations made to determine the cause of the transmission jumping out of high gear it was found that the face 14a was not in a plane positioned ninety degrees to the longitudinal axis of the crank shaft main journals 5. The reasons for this irregularity are that the clutch housing was not carefully and accurately made, or if it was carefully and accurately made, it was pulled into a bind and twist when it was attached to the engine crank shaft case, and this caused the above described trouble. The foregoing description is that in particular of the Chevrolet vehicle engine, clutch and transmission housing, and it is the face 14a that must be ground to a true surface and that surface must lie in the plane that is positioned ninety degrees to the longitudinal axis of the main journals 5 of the engine crank shaft. In view of this requirement I have designed and built my improved housing grinder for transmission alignment.

The grinder device as I have built it and as shown in the accompanying drawings consists of a front rectangular frame element 16 and a rear U-shaped frame element 17. The frame elements 16 and 17 are spaced apart and are parallel with each other and are rigidly held in this position by means of four spacer shafts 18, 19, 20 and 21. Each end of each spacer shaft 18, 19, 20 and 21 is reduced in diameter as shown at A and is threaded so as to receive a nut such as 22 whereby the frame elements 16 and 17 may be solidly forced and held against the annular shoulders B formed between the spacer shafts 18, 19, 20 and 21 and their reduced end portions A to form a rigid frame work for the machine. All the spacer shafts 18, 19, 20 and 21 are positioned parallel with each other.

The machine is provided with an alignment shaft 23 the forward end portion 23a is reduced in diameter to form the annular shoulder 24 between the alignment shaft 23 and the reduced portion or pin 23a formed on the forward end of the alignment shaft 23. The pin 23a is snugly receivable in the opening 10a of the bearing element 10. The rear end of the alignment shaft 23 is provided with a first increased diameter journal portion 25 and a second increased diameter abutment portion 26, the shaft 23, journal portion 25, and the abutment portion 26 and alignment pin portion 23a are all as one integral piece. The rear abutment face 26a of the abutment element 26 is machined to a position exactly ninety degrees to the center axis of the alignment shaft 23. The abutment face 26a is positioned against the upper mid-portion of the front frame element 16 and is rigidly fixed thereto by means of cap screws 27 that slidably pass through holes in the front frame element 16 and are threaded into the abutment element 26 whereby the alignment elements 23a, 23, 25 and 26 are solidly attached to and held exactly at ninety degrees to the front frame plate element 16 and also in parallelism with the spacer shafts 18, 19, 20 and 21.

Snugly and revolvably fitted on the journal portion 25 and bearing against the shoulder 25a is a circular, slightly inwardly bevel edged alignment plate 28 that is of such diameter that its bevel edge will fit snugly in the bevelled circular opening 15 in the rear wall 14 of the clutch housing to definitely locate and hold the center axis of the alignment element 23a—23—25—26 at the point of the alignment plate 28 on the center axis line of the main journals 5 of the engine crank shaft. The alignment plate 28 is held in place on the alignment element portion 25 by means of a nut 29 that is threaded on the alignment shaft 23 and engages the alignment plate 28 to snugly but revolvably hold the alignment plate 28 against the shoulder 25a. A lock nut 30 is also threaded on the alignment shaft 23 to bear against and lock the nut 29 in its adjusted position.

The alignment plate 28 is provided with a plurality of stud bolts 31 that are threaded into the alignment plate 28 adjacent the edge thereof and project rearwardly therefrom. On each stud bolt 31 is revolvably mounted a retainer lug 32 that can be revolved so that one end thereof will project beyond the peripherial edge of the alignment plate 28. Each retainer lug 32 will slide forwardly and rearwardly on its respective stud bolt 31 and is adjustably retained thereon by a nut 33 that is threaded on the stud bolt 31.

A carriage element 34 is snugly fitted and longitudinally slidably carried on the spacer shafts 20 and 21. The carriage 34 is provided with a depending leg element 35 that is rigid therewith, preferably on integral parts thereof.

An adjustment screw 36 is threaded through the depending end portion of the depending leg element 35. One end of the screw 36 is provided with a knurled thumb piece 37 that is rigidly mounted thereon and by which the screw 36 may be turned for adjustment purposes as will later be described. The other end of the adjustment screw 36 is revolvably retained in a retainer mounting 38 that is rigidly mounted on and carried by the forward frame plate 16 so that as the adjustment screw 36 is turned it will move the carriage element 34 forwardly or rearwardly depending on the direction of rotation of the adjusting screw 36.

The front portion of the plate of the carriage element 34 is provided with an upwardly projecting support element 39 that has a hole 40 therethrough to provide a seat formation in the upper end thereof to receive, support and hold the bearing casing of, the front end portion of a standard electric drill motor 41, in this instance the drill motor 41 is shown as having a handle 41a. The rear end of the carriage element 34 is provided with an upwardly, rearwardly, and then sidewise extending bracket or support element 42, and in the end portion of the side wise extending portion of the bracket element 42 is a center or support screw 43 that is threaded therethrough the rear end of the screw 43 is provided with a knurled head 44 by which the screw 43 may be turned for purposes that will later be described. The forward end of the screw 43 may be conical or hemispherical in shape to be received in an indenture 45 in the rear end portion of the drill motor 41 so as to bind and hold the drill 41 in and between the support element 39—40 and the center screw 43 in such a manner as to hold the center longitudinal axis of the drill motor drive shaft 46 in parallelism with the center longitudinal axis of the engine crank shaft journals 5 and the alignment shaft 23a—23—24—26 and the spacer shafts 20 and 21, the end of which is threaded as indicated at 47 the same as usual.

A nut 48 is threaded on the threads 47 and a flat sided grinder wheel 49 is also threaded on the threaded motor shaft 46—47 and bears against the nut 48 as a stabilizing and locking means for the grinder wheel 49 on the shaft 46. If the grinder wheel 49 should happen to be a thin one it may be necessary to provide some additional support for it. This may be done by placing a stiff washer 50 between the grinding wheel 49 and the nut 48 as shown in Fig. 1. The side G of the grinder wheel 49 is adapted to be brought into engagement with the bearing face 14a of the clutch case vertical wall 14 for grinding purposes as will later be described.

To do the necessary grinding job the transmission case is removed from the clutch housing wall 14 to expose the wall surface 14a, the bevelled circular opening 15 and to afford access to the recess 9 in the rear end of the engine crank shaft and bearing 10—11—12 therein, also the closure plate 13b is removed from the clutch housing 13 to leave the inspection opening I open for reasons that will later be made obvious.

The clutch case, etc. having thus been prepared is ready to receive the grinding machine preparatory to doing the job of grinding. The grinding machine is positioned in place by first entering its drive shaft 23 through the bevel edged opening 15 and seating the drive shaft pin extension 23a in the bearing opening 10a, and simultaneously the bevel edge of the circular alignment plate 28 will seat itself in bevelled edge defining the circular opening 15. The machine having thus been placed, the operator may then reach his hand through the inspection opening I and turn the retainer lugs 32 outwardly to overlap the inner face of the rear clutch housing wall 14 whereupon the nuts 33 may be screwed on the studs 31 toward the retainer lugs 32 until the retainer lugs 32 are engaged and tightly pressed against the inner face of the rear clutch case wall 14 whereupon the circular alignment plate 28 will be pulled and tightly fitted to the opening 15 and the machine is then properly positioned and rigidly held ready to do the job of grinding.

The machine having thus been positioned the drill motor 41 may be started whereupon the grinder wheel 49 will be speedily revolved. Now the adjusting screw 36 may be turned to move the carriage 34 and motor 41 thereon forward until the vertical face G of the grinder wheel 49 engages the rear or outer face 14a of the rear wall 14 of the clutch case, whereupon the supporting frame carried by the alignment element 26 may be slowly revolved by hand and as it revolves the grinder wheel 49-G will grind the face 14a of the wall 14 to a true plane that is positioned exactly ninety degrees to the center axis of the crank shaft journals 5.

The face 14a of the wall 14 having been ground as above described the grinding machine may be removed from the clutch case and the vehicle transmission remounted thereon in a now perfectly aligned position whereupon it will be found that the trouble of the transmission jumping out of gear has been corrected and overcome.

While the grinder device as shown and described may be the preferred form of the machine, it is to be understood that such modifications of the device may be employed as lie within the scope of the appended claim without departing from the spirit and intention of the invention. Now having fully shown and described my invention, what I claim is:

In a clutch case grinder device of the kind described for use on an engine structure having a crank shaft including main journals, a clutch case having a rear wall having an opening therein to receive a transmission stationing and centering element about the center axis of the main journals of the crank shaft, the grinder structure comprising a support element, said support element being receivable in the said opening in the clutch case, and means engageable with the support element and the rear wall of the clutch housing for holding the support element rigid with the rear wall of the clutch case and centered on the center axis of the main journals of the crank shaft, an alignment shaft, one end of said alignment shaft being centered and carried in one of the main journals of the crank shaft, said alignment shaft being revolvably carried by the said support element at a spaced distance from the main journal carrying the end of the alignment, a support frame, said support frame being carried on the other end of the alignment shaft and being revolvable about the center axis of the alignment shaft, a power unit carriage, said carriage being adjustably movable longitudinally on the support frame and having means for receiving a power unit thereon, a detachable power unit, said power unit being mounted on the said carriage in parallel relation with the center axis of the alignment shaft, a grinder wheel carried on a shaft, one end of said grinder wheel shaft being mountable in and demountable from a chuck carried by the rotatable part of the power unit, and means for moving the said carriage to bring the grinding wheel into engagement with the face of the clutch housing wall for the purpose specified.

References Cited in the file of this patent

UNITED STATES PATENTS

| | | |
|---|---|---|
| 1,365,149 | Breed | Jan. 11, 1921 |
| 1,395,194 | Lindhe | Oct. 25, 1921 |
| 1,570,042 | Clay | Jan. 19, 1926 |
| 1,860,846 | Watt | May 31, 1932 |
| 1,877,782 | Albee | Sept. 20, 1932 |
| 1,950,815 | Rhyne | Mar. 13, 1934 |
| 2,297,074 | Rohrdanz | Sept. 29, 1942 |
| 2,412,199 | Blood | Dec. 10, 1946 |
| 2,439,279 | Andrus | Apr. 6, 1948 |
| 2,491,565 | Johnson | Dec. 20, 1949 |

FOREIGN PATENTS

| | | |
|---|---|---|
| 548,152 | Great Britain | Sept. 28, 1942 |